United States Patent [19]
Battermann et al.

[11] Patent Number: 5,904,944
[45] Date of Patent: May 18, 1999

[54] USE OF POLYGLYCEROL FOR PROCESSING FOODSTUFF

[75] Inventors: Winfried Battermann, Langenhagen; Wolfgang Dilla; Helmut Dillenburg, both of Rheinberg, all of Germany

[73] Assignee: Solvay Alkali GmbH, Hanover, Germany

[21] Appl. No.: 08/705,125

[22] Filed: Aug. 29, 1996

[30] Foreign Application Priority Data

Sep. 29, 1995 [DE] Germany .................. 195 36 338

[51] Int. Cl.⁶ ...................................... A23L 1/30
[52] U.S. Cl. .................. 426/281; 426/442; 426/496; 426/804
[58] Field of Search .................... 426/442, 496, 426/566, 611, 804, 281

[56] References Cited

U.S. PATENT DOCUMENTS

| | | | |
|---|---|---|---|
| 3,515,562 | 6/1970 | Landfried et al. | 99/136 |
| 3,936,391 | 2/1976 | Gabby et al. | 252/356 |
| 3,968,169 | 7/1976 | Seiden et al. | 568/680 |
| 4,046,874 | 9/1977 | Gabby et al. | 426/116 X |
| 4,226,890 | 10/1980 | Howard | 426/104 X |
| 4,456,626 | 6/1984 | Nelson et al. | 426/554 X |
| 4,889,740 | 12/1989 | Price | 426/417 X |
| 5,043,179 | 8/1991 | Klemann et al. | 426/531 |
| 5,185,091 | 2/1993 | Ogake et al. | 252/56.5 |
| 5,219,604 | 6/1993 | Klemann et al. | 426/531 |
| 5,243,086 | 9/1993 | Jakobson et al. | 568/619 |

OTHER PUBLICATIONS

Hawley's Condensed Chemical Dictionary, 12th Edition, p. 935, date unknown.

*Primary Examiner*—Milton Cano
*Attorney, Agent, or Firm*—Evenson, McKeown, Edwards & Lenahan, P.L.L.C.

[57] ABSTRACT

The invention relates to the use of polyglycerols in the manufacture of foods, in particular for influencing texture formation, water absorption capacity, freshness, inhibition of crystallization, protein denaturation and the improvement of the freeze and thaw stability and for fat replacement.

19 Claims, No Drawings

USE OF POLYGLYCEROL FOR PROCESSING FOODSTUFF

BACKGROUND OF THE INVENTION

This invention relates to a process and the use of polyglycerols for processing foodstuffs, or in other words, for manufacturing foods.

The use of polyglycerol fatty esters for foodstuff processing in the food industry is known. Polyglycerol fatty esters, because of their properties, are also used as emulsifiers for food manufacturing.

As a result of nutritional studies, it has been established that polyglycerol fatty esters are readily tolerated, are enzymatically cleaved and the fatty acids are utilized calorically in metabolism.

It is likewise known that polyglycerols are not catabolized in the human body, but are excreted unchanged. However, the literature does not contain any positive indications of the suitability of polyglycerols as a processing aid for foods.

In comparison with fats, polyglycerols, beginning with triglycerol, exhibit the typical fatty mouth feel.

SUMMARY OF THE INVENTION

The object of the invention was to improve foodstuff processing by making available additives having useful functional properties by which foods can be advantageously influenced sensorially and technologically.

It has been found that polyglycerols can be used as a functional additive for the processing of foods.

As used herein, the term "polyglycerols" in the context of the invention is understood to refer to diglycerol, triglycerol, tetraglycerol, pentaglycerol, hexaglycerol and higher oligomers of glycerol.

These polyglycerols can be either linear, branched or cyclic compounds. They can be used either individually or in a mixture within and/or among these classes.

Because of their properties, in particular with regard to metabolism, polyglycerols are to be considered in particular as fat substitutes.

DETAILED DESCRIPTION OF PREFERRED EMBODIMENTS

According to the invention, the polyglycerols are incorporated as an additive into the food, or as a recipe constituent. Depending on application, the additive can be added in amounts of 1 to 50% by weight, without adverse effects on taste becoming noticeable.

It is possible to incorporate the additives in the form of injections, e.g. in the case of fish or meat. It is likewise possible to simply add the additives to the appropriate recipe mixture, e.g. into fondant mixture, into American-style muffin mixtures, into cheese formulas, ice cream, bread spreads, lebkuchen or fruit pastes for baking.

In a preferred embodiment, diglycerol (DGLC), triglycerol (TGLC), polyglycerol (PGLC) and/or polyglycerol having an increased content of tetraglycerol (PGLCT) are used.

In preferred embodiments, a product having a diglycerol content of at least 900 g/kg is used as diglycerol; a product having a triglycerol content of at least 800 g/kg is used as triglycerol, and in particular, a product having a content of

| diglycerol | 150 to 300 g/kg |
| triglycerol | 350 to 550 g/kg |
| tetraglycerol | 100 to 250 g/kg |
| pentaglycerol and higher oligomers | max. 150 g/kg. | or a product having a content of

| di-, tri- and pentaglycerol | max. 500 g/kg |
| tetraglycerol | min. 400 g/kg |
| hexa-, hepta-, octaglycerol | max. 200 g/kg | is used as polyglycerol.

In another preferred embodiment, the additive used according to the invention contains, in addition to diglycerol (approximately 15 to 30% by weight) principally higher-condensed oligomers of glycerol, such as triglycerol (approximately 35 to 55% by weight), tetraglycerol (approximately 10 to 25% by weight) and pentaglycerol (a maximum of 10% by weight). Higher oligomers such as hexaglycerol and heptaglycerol are present to only a small extent; cyclic diglycerol, triglycerol and tetraglycerol are virtually absent.

In another likewise preferred embodiment, the polyglycerol used according to the invention principally contains the higher-condensed oligomers of glycerol such as triglycerol (approximately 15% by weight), tetraglycerol (at least 40% by weight) and pentaglycerol (approximately 20% by weight), the content of diglycerol, triglycerol and pentaglycerol not exceeding 50% by weight. Higher oligomers such as hexaglycerol and heptaglycerol and cyclic diglycerol, triglycerol and tetraglycerol are present only in a small amount.

The polyglycerols are prepared industrially, for example, by thermal or catalytic condensation of glycerol or by hydrolysis of epichlorohydrin.

It has been found that the products used according to the invention are suitable for influencing, in particular, texture formation water absorption capacity storage quality inhibition of crystallization protein denaturation and/or freezing and thawing stability.

It has further been found that polyglycerols from triglycerol can be used as fat substitutes.

In one embodiment, boiled ham, fish, ice cream, imitation cheese, fresh cheese, lebkuchen, American-style muffins, fruit pastes, fondant, and/or bread spread are prepared using the additives of the invention. It is, of course, possible to use the additives of the invention for other foods as well.

In comparison with the traditional additives, the additives of the invention do not represent simple substitutes, but they are an enrichment of the available palette of processing or manufacturing aids.

The sweet taste of the polyglycerols can be limiting for the use and rate of addition. It has been found that it is possible to prepare fish or boiled ham using polyglycerols without an undesirable sweet taste becoming noticeable if the addition is maintained at not more than 3% by weight.

Boiled ham was treated according to the invention with a polyglycerol-containing injection brine. The concentration of polyglycerol in the injection brine was selected in such a way that the boiled ham in edible form contained 1 to 8% by weight of polyglycerol.

In order to prepare fish, the fish flesh was treated with a brine which contained an amount of polyglycerol such that 0.5 to 5% by weight of polyglycerol was present in the fish flesh after the treatment.

Addition of polyglycerols can improve, in particular, the water absorption capacity ($a_W$ decrease). The growth of mold and yeast is inhibited by the substantial binding of the free water in the food, and thus the processed foods stay fresh and edible for a longer time.

It is known that in the storage of ice cream, in particular, fluctuations in the storage temperature occur, which lead to changes in the structure of the ice cream. Addition of polyglycerols influences the recrystallization of lactose in the ice cream in such a way that the sandiness which is objectionable to the consumer no longer occurs. According to the invention, 1 to 10% by weight of polyglycerol, based on the ice mixture, are added to the ice mixture.

In the production of confectionery products, e.g. fondant, addition of polyglycerols substantially improved the kneadability of the paste to be shaped. No recrystallization of the sugar could be observed. According to the invention, 1 to 6% by weight of polyglycerol, based on the finished paste, was added to the fondant paste.

A preferred application is the preparation of fish. It has been found that extensive protein denaturation which occurs after steaming and subsequent thermal sterilization of the fish flesh, is very greatly decreased by addition of polyglycerols. It has been shown that the fish flesh does not develop the unpleasant straw-like flavor. It was, moreover, surprising that the expected sweet taste of the polyglycerols does not have an adverse effect on the flavor of the fish if the polyglycerol content in the fish flesh is less than 5% by weight.

In one embodiment, the polyglycerol is injected into the fish muscle. However, other techniques are also conceivable and possible. Thus, for example, freshly caught fish or filleted fish can be dipped into a polyglycerol-containing bath before being frozen into blocks. The dipping process is a gentle process for fish flesh and is therefore particularly suitable for manufacturing fish fillets.

In another embodiment, boiled ham was treated with the additives of the invention. It was found that the volume of the boiled ham prepared according to the invention could be increased. Increases in volume of approximately 5 to 60% are possible without impairment of taste. To achieve the high volume increase of, e.g., 60%, a mass ratio of polyglycerol to vegetable protein or protein from milk or mixtures thereof of 5:1 or 5:0.5 should be selected. Even after a storage time of 6 weeks, no separation of meat juice could be observed.

In the production of cakes and bakery products, the addition of the additives of the invention retards the development of yeast and mold, for example, due to the binding of the free water. This bound water in the bakery product is then no longer available for the metabolism of the yeasts and molds. According to the invention, 2 to 15% by weight of polyglycerol, based on the batter mixture, was added to the batter mixture, for the production of cakes made by creaming, in particular for the production of American-style muffins. By making use of the maximum amount of polyglycerol, the butter fat used can be substantially replaced, in order to obtain by this means a reduced-fat food. The low rates of addition of 2% by weight already lead to a decrease in a.

It has further been found that in the case of lebkuchen containing a maximum of 5% by weight of polyglycerol in the cake mixture, the onset of staleness is delayed. Due to the delayed staling, the desired soft texture in combination with the chewing properties remains substantially stable over the entire period of edibility.

In a further embodiment of the invention, a maximum of 5% by weight of polyglycerol, based on the fruit paste, was added to fruit pastes for baking. As used herein, the term "fruit pastes" within the scope of the invention refers to fruit products made of at least 30% fresh fruit, starch and other hydrocolloids. Addition of polyglycerols according to the invention reduces $a_W$ and thus delays development of molds and yeasts.

In a further embodiment, 1 to 15% by weight of polyglycerol, based on the cheese mixture, was added according to the invention to a cheese mixture for the production of imitation cheese. By making use of the maximum amount of polyglycerol, the butter fat used can be substantially replaced, in order in this way to obtain a reduced-fat food.

In another embodiment, 1 to 10% by weight of polyglycerol, based on the cheese mixture, was added to a cheese mixture for the production of fresh cheese. The tendency for whey to separate over the period of edibility during the storage of the fresh cheese in a refrigerator could be counteracted as a function of the dosage rate of the polyglycerol. The polyglycerol addition gives the fresh cheese a creamier structure, as a result of which a considerably better spreadability is achieved.

By addition of the additives of the invention in the production of bread spread, the fat content, for example, can be reduced. Thus, in one embodiment, a maximum of 30% by weight polyglycerol, based on the margarine mixture, was added to a mixture for the production of margarine. It is likewise possible to produce other types of bread spreads, and, by addition of a maximum of 50% by weight of polyglycerol, based on the bread spread mixture, the energy content can likewise be decreased.

The following examples are intended to further illustrate the invention without limiting its scope.

The following acronyms are used

| | |
|---|---|
| DGLC | diglycerol |
| TGLC | triglycerol |
| PGLC | polyglycerol |
| PGLCT | polyglycerol having an increased tetraglycerol content |

EXAMPLE 1

Processing of Herring Fillet

Injection brine used:

| | |
|---|---|
| 1.PGLC | 10% |
| Water | 90% |
| 2.TGLC | 10% |
| Water | 90% |
| 3.PGLCT | 10% |
| Water | 90% |
| 4.PGLC | 7.5% |
| Whey protein concentrate (WPT) | 2.5% |
| Water | 90% |

1 kg of injection brine was injected into 5 kg of herring fillets using a multi-needle system.

| | |
|---|---|
| Tumbler setting | 5 rpm/0.95 bar |
| Tumbling time | 5 min + 5 min |
| Freezing temperature | −22° C. |

EXAMPLE 2

Processing of Cod Fillet

Injection brine was injected into 3 kg of cod fillet in a similar manner to Example 1.

The draining losses of herring fillets and cod fillets were each measured after storage for 2 and 84 days. See Tables 1 and 2 for results. The results show that improved freezing and thawing stability can be achieved by the addition of polyglycerol. Partial destruction of the cells by ice crystals originating from the freezing process, and the efflux of the tissue water, are decreased.

EXAMPLE 3

Sterilized Herring Fillets

Fish sauce formula:

| Ingredient | % by weight |
|---|---|
| Starch, Calfo | 4.0 |
| Flour, type 505 | 3.0 |
| Sugar | 11.0 |
| Salt | 6.5 |
| Fondor | 5.0 |
| Soya oil | 10.0 |
| Modified whey protein concentrate WPT | 0.8 |
| Thickener - xanthan | 2.0 |
| Spice vinegar 7% strength | 2.0 |
| Water | 55.7 |

The pulverulent mixture constituents were incorporated into the previously introduced water with slow stirring. Then the oil was added slowly and the mixture was emulsified in a Silverson emulsifying machine. After addition of the spice vinegar, the sauce was emulsified once more for approximately 2 minutes.

The herring fillets (each 100 g) prepared according to Example 1 and 100 g of sauce were sterilized in 200 g cans at 118° C. for 30 minutes in a vertical autoclave.

After 14 days, the fish was sensorially evaluated. The herring fillets containing the polyglycerol additives were substantially juicier and left a better chewing impression than the untreated sample or the sample containing the whey protein concentrate.

EXAMPLE 4

Boiled Ham

Injection brine:

| Ingredients | % by weight |
|---|---|
| Water | 82.6 |
| Nitrite curing salt | 5.3 |
| Lactose (Variolac 90) | 1.3 |
| Phosphate (STP) | 1.1 |
| Na ascorbate | 0.1 |
| Whey protein (HA-7570) | 1.6 |
| Polyglycerol | 8.0 |

The brine cooled to 5° C. was introduced into the ham using the multi-needle injector. Prior to tumbling, the meat was treated with a blade tenderizer system for better brine absorption. The meat was placed in the tumbler and the remainder of the injection brine was added for a volume increase of 60%. The meat was tumbled at 12 rpm under vacuum (0.95 bar) for 12 hours. The prepared meat was then cooked in molds in the cooking chamber at 72° C. until the core temperature of 68° C. was achieved, then cooled, sealed into polypropylene bags under vacuum and stored at 5° C.

The meat was sensorially evaluated 3 days after production. In all cases the boiled ham exhibited a dry surface and thus no release of meat juice. This good sensory result was confirmed even after storage for 6 weeks at 4° C. The texture parameters (elasticity, coherence, adhesiveness and firmness) of the meat, i.e. boiled ham, were unchanged by the addition of the polyglycerols.

EXAMPLE 5

Imitation Cheese containing 21% Fat

| Formula | Blank sample % by weight | PGLC/50% replacement of butter % by weight (according to the invention) |
|---|---|---|
| Ca caseinate | 26.0 | 26.0 |
| Butter | 26.0 | 13.0 |
| | (21 absolute) | (10.6 absolute) |
| Emulsifying salts (phosphate mix) | 1.6 | 1.6 |
| Salt | 0.8 | 0.8 |
| Water | 45.6 | 45.6 |
| | | (of which, approximately 10% condensate) |
| PGLC | — | 13.0 |
| 3% strength lactic acid for pH adjustment | 0.8 ml | 1.3 ml |

The formula constituents were first mixed in a Stephan cutter with direct steam input and then heated at 82° C. at 80 rpm for 2 minutes. After the pH was adjusted using 3% strength lactic acid, the mixture was heated once more at 82° C. for 2 minutes at 80 rpm. The hot mixture was packaged into containers and stored for 12 hours at 4 to 8° C. and then sensorially evaluated. The addition of polyglycerol effected a marked reduction in viscosity, which had a beneficial effect on the packaging process.

The addition of polyglycerol beneficially affected the plasticity of the cheese dough and produced an improved creaminess in comparison with the blank sample. In a preferred embodiment, the salt content was somewhat increased and the fat replacement was restricted to a maximum of 25% (relative), which did not have an adverse effect on the cheese quality. The sweet taste of the polyglycerols limits the maximum fat replacement.

EXAMPLE 6

Fresh Cheese

| Formula | Blank sample % by weight | Sample (according to the invention) % by weight |
| --- | --- | --- |
| Skimmed milk curd cheese (18% DM) | 77.3 | 82.0 |
| Cream (40% fat, 48% DM) | 15 (6 absolute) | 6.0 (2.4 absolute) |
| Protein blend (Nutrilac QU 7560) | 7 | 5.3 |
| Salt | 0.7 | 0.7 |
| PGLC | — | 6.0 |

The formula constituents were mixed at 50° C. and a pH of 4.8 to 4.9 in a Stephan cutter equipped with direct steam input and pasteurized by direct heating to 85° C. The mixture was then cooled with stirring to 65 to 70° C. The cheese mixture was homogenized at 300 bar. The cheese mixture was then packaged into containers (of 250 g) and rapidly cooled to a temperature below 10° C. and stored at 4 to 8° C. Sensory evaluation was performed after 24 hours.

The texture of the fresh cheese with addition of polyglycerol was markedly creamier than that of the blank sample. The slight sweet note gave the fresh cheese a fuller taste note. Even after storage for 4 weeks, no visible whey separation could be observed. The texture retained the creamy character.

EXAMPLE 7

Lebkuchen

Ingredients of the lebkuchen mix (Martin Braun Co.):

Wheat flour

Brown sugar

Rye flour

Sugar

Spice mixture

Ammonium bicarbonate baking powder

Thickener (guar flour)

Whey powder

Wheat fibre

| Formula | Blank sample % by weight | Samples (according to the invention) % by weight |
| --- | --- | --- |
| Lebkuchen mix | 44.6 | 44.6 |
| Wheat flour type 505 | 22.3 | 22.3 |
| Honey | 22.0 | 20.0 |
| Water | 11.1 | 11.1 |
| PGLC | — | 2 |

PGLC used:

diglycerol (2-P)

triglycerol (3-P)

polyglycerol (4-P)

polyglycerol T (5-P)

The formula constituents were intimately mixed and kneaded, then the dough was allowed to stand at 4 to 8° C. for 24 hours. The dough was then rolled out to a dough thickness of 5 mm, shaped and baked in a circulating-air oven at 200° C. for 5 minutes. After cooling to room temperature, the lebkuchens were packaged in glass paper and stored at 17 to 20° C. Staleness could not be observed after a storage time of 42 days.

Addition of the additives of the invention caused a decrease in $a_W$ in comparison with the blank sample within satisfactory limits; starch retrogradation could not be observed.

| Samples | after 3 days | after 42 days |
| --- | --- | --- |
| Blank sample | 0.72 | 0.70 |
| 2-P (DGLC) | 0.59 | 0.59 |
| 3-P (TGLC) | 0.58 | 0.58 |
| 4-P (PGLC) | 0.56 | 0.56 |
| 5-P (PCLCT) | 0.56 | 0.57 |

After 42 days, no visible mold growth could be observed on the samples with addition of additives, in contrast to the blank sample.

EXAMPLE 8

Creamed mixture for American-style muffins

| Formula (Values in % by weight) | 0-P | 2-P | 3-P | 4-P | 5-P | 6-P |
| --- | --- | --- | --- | --- | --- | --- |
| Flour type 505 | 15.0 | 15.0 | 15.0 | 15.0 | 15.0 | 15.0 |
| Margarine | 21.0 | 10.5 | 10.5 | 10.5 | 10.5 | 10.5 |
| Wheat starch | 15.0 | 15.0 | 15.0 | 15.0 | 15.0 | 15.0 |
| Sugar | 24.0 | 17.0 | 17.0 | 17.0 | 17.0 | 17.0 |
| Whole egg | 21.0 | 21.0 | 21.0 | 21.0 | 21.0 | 21.0 |
| Water | 3.0 | 3.0 | 3.0 | 3.0 | 3.0 | 3.0 |
| Emulsifier ME 8310 | — | — | — | — | — | 1.0 |
| Salt | 0.4 | 0.4 | 0.4 | 0.4 | 0.4 | 0.4 |
| Ammonium bicarbonate baking powder | 0.6 | 0.6 | 0.6 | 0.6 | 0.6 | 0.6 |
| Dextrose | — | 7.0 | 7.0 | 7.0 | 7.0 | 7.0 |
| Diglycerol | — | 10.5 | — | — | — | — |
| TGLC | — | — | 10.5 | — | — | — |
| PGLCT | — | — | — | 10.5 | — | — |
| PGLC | — | — | — | — | 10.5 | 10.5 |
|  | 100 | 100 | 100 | 100 | 100 | 101 |

The ingredients were mixed and whipped for 5 minutes in the all-in process, then the dough mixture (portion weight 40 g) was placed in molds and baked for 15 to 16 minutes. To determine the development in $a_W$, the muffins were packaged in glass paper and stored at 17 to 20° C.

| Samples | 3 days | 42 days |
| --- | --- | --- |
| Blank sample | 0.78 | 0.73 |
| 2-P (DGLC) | 0.59 | 0.61 |
| 3-P (TGLC) | 0.59 | 0.60 |
| 4-P (PGLC) | 0.58 | 0.58 |
| 5-P (PGLCT) | 0.57 | 0.60 |

The addition of the additive of the invention caused a marked $a_W$ decrease. The polyglycerols were able to bind the free water in the dough beyond the baking phase. This was demonstrated by the baking losses. The addition of polyglycerols produced a baking loss of 4 to 6%. In the blank sample, this value was 9%.

The muffins were characterized by an improved storage quality. The muffins were stored and observed for 42 days. Visible mold growth occurred 6 days earlier in the blank sample.

EXAMPLE 9

Half-fat Margarine

Formulation

| Ingredients | Blank sample [%] | 1-P % by weight | 2-P % by weight | 3-P % by weight |
|---|---|---|---|---|
| Water phase | | | | |
| Gelatin 200 bloom | 2.0 | 2.0 | 2.0 | 2.0 |
| K sorbate | 0.1 | — | — | — |
| Salt | 0.5 | 0.5 | 0.5 | 0.5 |
| Water | 56.9 | 57.0 | 57.0 | 57.0 |
| PGLCT | — | 20.0 | — | — |
| PGLC | — | — | 20.0 | — |
| TGLC | — | — | — | 20.0 |
| Fat phase | | | | |
| Fat blend (Polawar E31, m.p. 38° C.) | 40.0 | 20.0 | 20.0 | 20.0 |
| Emulsifier (Dimodan (P)) | 0.5 | 0.5 | 0.5 | 0.5 |
| pH | 5.8 | 5.8 | 5.7 | 5.7 |
| pH adjustment to blend | 5.5 | 5.5 | 5.4 | 5.4 |
| citric acid 17% strength | 1.8 | — | — | — |
| Na hydroxide solution 17% strength | — | 2.1 | 2.8 | 2.3 |

Flavoring
Flavoring 7822 butter, natural 0.05%
Flavoring 2662 butter, natural 0.024%

To prepare the margarine, the fat phase was heated to 42° C. and introduced with slow stirring into the previously introduced aqueous phase at 45° C. The emulsion was cooled and structured via a Perfektor unit having two straight-surface cooling cylinders and a reworking cylinder. Emulsion formation occurred without difficulty in the presence of the polyglycerols. It was possible to replace 50% of fat.

EXAMPLE 10

Soft Ice Cream

| Ingredients | Blank sample % by weight | 1-P % by weight | 2-P % by weight |
|---|---|---|---|
| Water | 47.2 | 50.8 | 54.4 |
| Cream (DM 48%, 40% fat) | 26.3 | 19.7 | 13.2 |
| Glucose | 4.0 | 4.0 | 4.0 |
| Sugar | 7.0 | 7.0 | 7.0 |
| Lactose (Variolac 95) | 5.0 | 5.0 | 5.0 |
| Protein compound (IC-3505) | 4.8 | 4.8 | 4.8 |
| Skimmed milk powder | 4.8 | 5.3 | 5.8 |
| Emulsifier (5912) | 0.6 | 0.6 | 0.6 |
| Vanilla | 0.3 | 0.3 | 0.30 |
| PGLC | — | 2.5 | 5.0 |

The ingredients were incorporated successively with stirring into the previously introduced water. The mixture was then heated to 78° C. for pasteurization and homogenized (2-stage homogenization 160/60 bar). After ripening for 12 hours at 4° C., the ice mixture was produced using the Gel-O-Mat Freezer 100. The hardening proceeded at −22° C.

Recrystallization of lactose could not be observed even after a temperature interval test (−18° C./24 hr., −5° C/48 hr., −18° C./24 hr.) over 8 weeks. The addition of polyglycerols increased the viscosity of the ice mix prior to the freezer. The ready-to-eat ice cream with addition of polyglycerol is substantially softer and, due to the softer structure, has an improved melting behavior and thus a fuller mouth-feel.

EXAMPLE 11

Fondant Paste

| Formulation | Blank sample % by weight | 1-P % by weight |
|---|---|---|
| PGLC | — | 6.0 |
| Starch syrup | 9.4 | 3.4 |
| Sucrose raffinate I | 83.5 | 83.5 |
| Water | 27.8 | 27.8 |
| Boiling loss | 20.7 | 19.1 |
| Yield | 100.0 | 101.6 |

To produce the fondant paste, the sucrose was incorporated into the water with stirring and an increase in temperature to 45° C. The mixture was further stirred moderately and heated to 75° C. The starch syrup was then added with simultaneous heating of the mixture to 90° C. The polyglycerol was then added. The temperature was then increased to 103° C. and stirred while maintaining the temperature until the fondant paste was clear.

As a result of its improved plasticity, the fondant paste of the invention could be shaped very much better than the blank sample. The surface gloss was unchanged even after a storage time of 3 weeks.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

TABLE 1

Drainage loss after brine injection and re-thawing of "herring fillets"

| Polyglycerol-containing brine | Brine absorption after tumbling % by weight | Brine drainage prior to freezing % by weight | Brine drainage after thawing Storage time: 2 days % by weight | | Brine drainage after thawing Storage time: 84 days % by weight |
|---|---|---|---|---|---|
| | | | immediately | after 1 hour | |
| Water (blank sample) | 2.1 | 3.6 | 3.0 | 2.8 | 3.5 |
| Polyglycerol T | 3.6 | 1.9 | 2.6 | 2.5 | 2.3 |
| Triglycerol | 2.7 | 2.7 | 2.4 | 1.8 | 2.0 |
| Polyglycerol | 3.5 | 3.5 | 2.4 | 2.2 | 2.5 |
| Polyglycerol + WPT* | 5.0 | 3.0 | 2.3 | 2.5 | 2.5 |

*WPT modified whey protein concentrate

TABLE 2

Drainage loss after brine injection and re-thawing of "cod fillets"

| Polyglycerol-containing brine | Brine absorption after tumbling % by weight | Brine drainage prior to freezing % by weight | Brine drainage after thawing Storage time: 2 days % by weight | | Brine drainage after thawing Storage time: 84 days % by weight |
|---|---|---|---|---|---|
| | | | immediately | after 1 h | |
| Water (blank sample) | 12.5 | 6.2 | 4.2 | 3.9 | 3.8 |
| Polyglycerol T | 12.9 | 5.3 | 1.2 | 2.6 | 2.7 |
| Triglycerol | 12.3 | 5.2 | 2.3 | 2.9 | 2.4 |
| Polyglycerol | 13.9 | 6.2 | 3.2 | 3.9 | 3.6 |
| Polyglycerol + WPT* | 14.0 | 6.1 | 3.9 | 3.4 | 3.5 |

*WPT modified whey protein concentrate

TABLE 3

Food additives for achieving product properties
Polyglycerols

| Food | Desired product properties | Polyglycerol addition % by weight | Fat replacement % by weight |
|---|---|---|---|
| Boiled ham 60% volume increase | Reduction in synaeresis Water binding | 1–3 | |
| Fish | Water binding Texture improvement | 1–3 | |
| Imitation cheese 11% fat absolute | Texture improvement Calorie reduction | ≦13 | ≦50 |
| Fresh cheese 2.4% fat absolute | Texture improvement Calorie reduction | ≦6 | ≦100 |
| Ice cream 5% fat absolute | Calorie reduction Avoidance of sandiness (recrystallization) | ≦5 | ≦50 |
| Anerican-style muffins 20% fat | Reduction in calories Improved storage quality | ≦10 | ≦50 |
| Lebkuchen | Improved storage quality | ≦2 | |
| Fondant | Plastic behavior | ≦3 | |
| Half-fat margarine 40% fat | Calorie reduction | ≦20 | ≦50 |

TABLE 4

Polyglycerol (PGLC types) - application tests in foods

| Food | Objective | PGLC types amount added % by weight | Result |
|---|---|---|---|
| Boiled ham | Synaeresis reduction<br>Improved storage quality<br>Improvement in storage stability | TGLC<br>PGLC<br>PGLCT<br>1–3 | No efflux of meat juice over 6 weeks in PP bag package<br>Fomation of slimy surfaces in the cut end after 7<br>days unpackaged at a storage temperature of 6–8° C. |
| Fish | Improved freeze/thaw stability<br>Textural improvement in sterilization processes | TGLC<br>PGLC<br>PGLCT<br>1–3 | Possible partial compensation of the exiting tissue water (1–2%)<br>Prevention of the total denaturation of the soluble fish protein<br>Slight sweet note, not unpleasant |
| Imitation cheese 11% fat absolute | Structural improvement<br>Fat replacement | PGLC<br>13 | Improved protein cross-linking<br>Lower viscosity in the heating phase<br>No organoleptic disadvantages at 25% fat replacement |
| Fresh cheese 2.4% fat absolute | Structural improvement<br>Fat replacement<br>Reduction in synaeresis | PGLC<br>6 | Very creamy structures achievable<br>Low tendency to release whey (30 days/ + 6–8° C.)<br>No organoleptic disadvantages at 50% fat replacement<br>Slight sweet note |
| Ice cream 5% fat absolute | Fat reduction<br>Crystallization inhibitor for sugar | PGLC<br>5 | No organoleptic disadvantages at 25% fat replacement<br>Freezing point depression 1–3° C.<br>Crystallization inhibition of the sugars<br>(Storage time 3 months) |
| American-style muffins | Improved water retention capacity<br>Improved storage quality<br>Structural improvement<br>Decrease in $a_w$<br>Fat reduction | TGLC<br>PGLCT<br>PGLC<br>each 10 | Decrease in $a_w$ between 0.05–0.1<br>Pores considerably more uniform<br>No development of yeast and mould |
| Lebkuchen | Improved water retention capacity<br>Decrease in $a_w$<br>Structural improvement | DGLC<br>TGLC<br>PGLCT<br>PGLC<br>each 2 | Reduction in $a_w$ between 0.05–0.1<br>No development of yeast and mould |
| Fondant | Improvement of plasticity | PGLC<br>6 | Plasticity is markedly improved<br>Moldable sugar mixture even at 78° C. |
| Half-fat margarine 40% fat | Fat reduction<br>Structuring<br>Preservative-free<br>Improved water retention capacity | PGLCT<br>PGLC<br>TGLC<br>each 20 | Structure can be built up with addition of gelatine/milk protein/vegetable protein<br>Stable water/oil emulsion<br>No fat migration can be observed (water/oil emulsion) |

GLC glycerol
PGLC polyglycerol
DGLC diglycerol
PGLCT polyglycerol with increased triglycerol content
TGLC triglycerol

What is claimed is:

1. A process for processing a foodstuff, said process comprising treating the foodstuff with a polyglycerol, wherein from 1 to 50% by weight of polyglycerol, based on the weight of the foodstuff, is added to said foodstuff.

2. A process according to claim 1, for processing a foodstuff, wherein said functional additive comprises at least one polyglycerol selected from linear polyglycerols, branched polyglycerols and cyclic polyglycerols.

3. A process according to claim 1, for processing a foodstuff, wherein the functional additive comprises at least one polyglycerol selected from diglycerol, triglycerol, tetraglycerol, pentaglycerol, hexaglycerol, and higher oligomers of glycerol.

4. A process according to claim 3, wherein the functional additive comprises a single polyglycerol.

5. A process according to claim 3, wherein the functional additive comprises a mixture of at least two polyglycerols.

6. A process according to claim 1, for processing a foodstuff, wherein said foodstuff is boiled ham, said process comprising treating the boiled ham with an injection brine which contains polyglycerol such that after the injection brine treatment, the ham in edible form contains from 1 to 8% by weight of polyglycerol.

7. A process according to claim 1, for processing a foodstuff, wherein said foodstuff is fish, said process comprising treating fish flesh with a brine which contains polyglycerol such that after the brine treatment the fish in edible form contains from 0.5 to 5% by weight of polyglycerol.

8. A process according to claim 1, for processing a foodstuff, wherein said foodstuff is imitation cheese, said process comprising adding to an imitation cheese mass from 1 to 15% by weight of polyglycerol, based on the imitation cheese mass.

9. A process according to claim 1, for processing a foodstuff, wherein said foodstuff is fresh cheese, said process comprising adding to a cheese mass from 1 to 10% by weight of polyglycerol, based on the cheese mass.

10. A process according to claim 1, for processing a foodstuff, wherein said foodstuff is ice cream, said process comprising adding to an ice cream mixture from 1 to 10% by weight of polyglycerol, based on the ice cream mixture.

11. A process according to claim 1, for processing a foodstuff, wherein said foodstuff is a cake made by creaming, said process comprising adding to a creamed cake batter mixture from 2 to 15% by weight of polyglycerol, based on the batter mixture.

12. A process according to claim 11, wherein said cake is a muffin.

13. A process according to claim 1, for processing a foodstuff, wherein said foodstuff is lebkuchen, said process comprising adding to a lebkuchen dough mixture an amount of polyglycerol ranging up to 5% by weight, based on the dough mixture.

14. A process according to claim 1, for processing a foodstuff, wherein said foodstuff is a fruit paste for baking, said process comprising adding to a fruit paste an amount of polyglycerol ranging up to 5% by weight, based on the fruit paste.

15. A process according to claim 1, for processing a foodstuff, wherein said foodstuff is a fondant, said process comprising adding to a fondant mixture from 1 to 6 weight % of polyglycerol, based the resulting total mixture.

16. A process according to claim 1, for processing a foodstuff, wherein said foodstuff is a bread spread, said process comprising adding to a bread spread mixture an amount of polyglycerol ranging up to 50% by weight, based on the bread spread mixture.

17. A process according to claim 1, for processing a foodstuff, wherein said foodstuff is margarine, said process comprising adding to a margarine mixture an amount of polyglycerol ranging up to 30% by weight, based on the margarine mixture.

18. A process according to claim 1, wherein said functional additive comprises at least one polyglycerol, and wherein said treating comprises incorporating in the foodstuff an amount of said functional additive sufficient to improve at least one foodstuff property selected from the group consisting of texture formation, water absorption capacity, storage quality, crystallization inhibition, protein denaturation, and freezing and thawing stability.

19. A process for improving a property of a foodstuff selected from texture formation, water absorption capacity, storage quality, inhibition of crystallization, protein denaturation, freezing and thawing stability, and for fat replacement, said process comprising incorporating in said foodstuff an effective foodstuff property improving amount of at least one polyglycerol to improve said property of said foodstuff.

* * * * *